United States Patent [19]
Okimoto et al.

[11] Patent Number: 5,337,158
[45] Date of Patent: Aug. 9, 1994

[54] FACSIMILE DATA PROCESSING APPARATUS

[75] Inventors: Satoshi Okimoto, Komaki; Kiyotaka Ohara, Nagoya; Takao Seki, Nagoya; Hifumi Kato, Nagoya, all of Japan

[73] Assignee: Brother Kogyo Kabushiki Kaisha, Nagoya, Japan

[21] Appl. No.: 813,822

[22] Filed: Dec. 27, 1991

[30] Foreign Application Priority Data

Dec. 27, 1990 [JP] Japan .................. 2-415278

[51] Int. Cl.⁵ ............................. H04N 1/41
[52] U.S. Cl. ................. 358/426; 358/470; 358/467
[58] Field of Search ............ 358/426, 261.1, 261.2, 358/261.3, 427, 435, 448, 467, 430, 470, 462, 449, 409, 470, 401; 395/110

[56] References Cited

U.S. PATENT DOCUMENTS

| | | | |
|---|---|---|---|
| 4,425,582 | 1/1984 | Kadakia et al. | 358/430 |
| 4,706,127 | 11/1987 | Nobuta | 358/449 |
| 4,759,053 | 7/1988 | Satomi et al. | 358/470 |
| 4,766,499 | 8/1988 | Inuzuka | 358/427 |
| 4,772,955 | 9/1988 | Kurahayashi | 358/426 |
| 4,819,063 | 4/1989 | Sugiura et al. | 358/470 |
| 5,153,746 | 10/1992 | Satoh | 358/401 |
| 5,157,519 | 8/1992 | Jacobs | 358/427 |

Primary Examiner—Edward L. Coles, Sr.
Assistant Examiner—Madeleine A. Nguyen
Attorney, Agent, or Firm—Oliff & Berridge

[57] ABSTRACT

In a facsimile data processing apparatus, printer code, including a line pitch amount control command and character codes are received from a host computer. The character codes are converted into image data and the image data is converted into transmission code, such as modified Huffman code. The space following the last character line on one page is neither converted into image data nor converted into transmission code, rather a control return code is added following the transmission code of the last character line on the page.

6 Claims, 8 Drawing Sheets

Fig.2B

| ITEM | INSTRUCTIONS |
|---|---|
| S1 | INITIALIZE IMAGE VERTICAL POSITION DATA AREA<br>INITIALIZE MH CODING VERTICAL POSITION DATA AREA<br>INITIALIZE PAGE LENGTH DATA AREA<br>INITIALIZE LINE PITCH AMOUNT DATA AREA |
| S2 | IMAGING PROCESS FOR ONE LINE |
| S3 | CONCLUSION INFORMATION FOR ONE LINE IS "1"? |
| S4 | STORE RTC IN MH CODING DATA BUFFER AREA |
| S5 | MHY < IMGY |
| S6 | INITIALIZE COUNTER C(=0) |
| S7 | C < 28 |
| S8 | CONVERT $C_{th}$ RASTER OF IMAGE DATA INTO MH CODE |
| S9 | C=C+1 |
| S10 | MHY=MHY+28 |
| S11 | STORE WHITE CODE (RUN LENGTH 1728) IN MH CODE DATA BUFFER AREA |
| S12 | MHY=MHY+1 |

Fig.3B

| ITEM | INSTRUCTIONS |
|---|---|
| S13 | INITIALIZE IMAGE DATA BUFFER AREA<br>INITIALIZE HORIZONTAL POSITION DATA AREA(CPX) |
| S14 | READ A CODE FROM RECEIVED DATA BUFFER AREA |
| S15 | PAGE FEED OR LINE FEED? |
| S16 | ADVANCE READ POINTER OF RECEIVED DATA BUFFER AREA |
| S17 | LINE PITCH AMOUNT CONTROL COMMAND"1"? |
| S18 | LINE=32 |
| S19 | LINE PITCH AMOUNT CONTROL COMMAND "2"? |
| S20 | LINE=48 |
| S21 | CONVERT CHARACTER CODE INTO IMAGE DATA |
| S22 | CPX=CPX+1 |

Fig.4B

| ITEM | INSTRUCTIONS |
|---|---|
| S23 | CPX=0 |
| S24 | ADVANCE READ POINTER OF RECEIVED DATA BUFFER AREA |
| S25 | PAGE FEED? |
| S26 | IMGY=IMGY+LINE |
| S27 | IMGY+32>PAGE? |
| S28 | CONCLUDE MAKING THE CONCLUSION INFORMATION"0" |
| S29 | CONCLUDE MAKING THE CONCLUSION INFORMATION"1" |

FACSIMILE DATA PROCESSING APPARATUS

BACKGROUND OF THE INVENTION

1. Field of the Invention

The invention relates to a facsimile data processing apparatus which converts image data, corresponding to character codes output from a host computer, into a transmission code, such as modified Huffman code, and outputs the converted code.

2. Description of Related Art

A facsimile data processing apparatus, which is connected to a host computer within a host computer apparatus or from outside of the host computer apparatus, outputs modified Huffman (MH) codes to telephone lines by converting characters corresponding to character data, outputted from the host computer, into image data and converting the image data into MH codes.

Therefore, a conventional facsimile data processing apparatus converts strings of characters, which correspond to inputted character code, into image data by using font patterns stored in a character font pattern memory; converts the converted image data into MH codes; and outputs the MH codes with modulation.

In the conventional facsimile data apparatus as described above, after the conversion from the character codes into image data by reference to a character font pattern memory, the space portion, from the last character for the page to the end of the page, is converted into image data and the image data for the space has been included in an image data memory. Therefore, there is a problem that the required capacity for the image data memory is larger than that required for just the message content. There is also the problem that the conversion time becomes great because the image data for the space must also be converted into MH code.

SUMMARY OF THE INVENTION

Accordingly, it is an object of the present invention to provide a facsimile data processing apparatus in which the conversion time from image data into transmission code is reduced.

Another object of the present invention is to provide a facsimile data processing apparatus in which the required capacity of an image data memory for a given message can be reduced.

A further object of the present invention is to provide a facsimile data processing apparatus in which the transmitting time is reduced.

According to the present invention, there is provided a facsimile data processing apparatus connectable to a host computer, comprising: received code memory means for receiving and storing printer control code and character code output from the host computer; first conversion means for converting the character code, stored in said received code memory means, into image data; second conversion means for converting the converted image data into transmission code; detecting means for detecting the last character code of a page stored in said received code memory means; and return code adding means for adding a return code following the transmission code for the last character code detected by said detecting means.

According to the above structure, a return code is added following the transmission code for the last character code. Therefore, any space following the last character line on a page is neither converted into image data nor converted into transmission code thus reducing the conversion time as well as the message transmitting time.

BRIEF DESCRIPTION OF THE DRAWINGS

The above and other objects, features and advantages of the invention will become more apparent from reading the following description of the preferred embodiment taken in connection with the accompanying drawings in which:

FIGS. 2A and 2B are a flow chart and a table of labels showing a conversion routine into modified Huffman code for one page;

FIGS. 3B and 4B are tables of labels for FIGS. 3A and 4A respectively;

DETAILED DESCRIPTION OF THE PREFERRED EMBODIMENT

Referring to the accompanied drawings, an embodiment of the present invention will be explained hereinafter. Although the modified Huffman (hereinafter, referred to as MH) coding method is employed as a coding method for image data in this embodiment, the coding method is not limited thereto.

Figure 1:
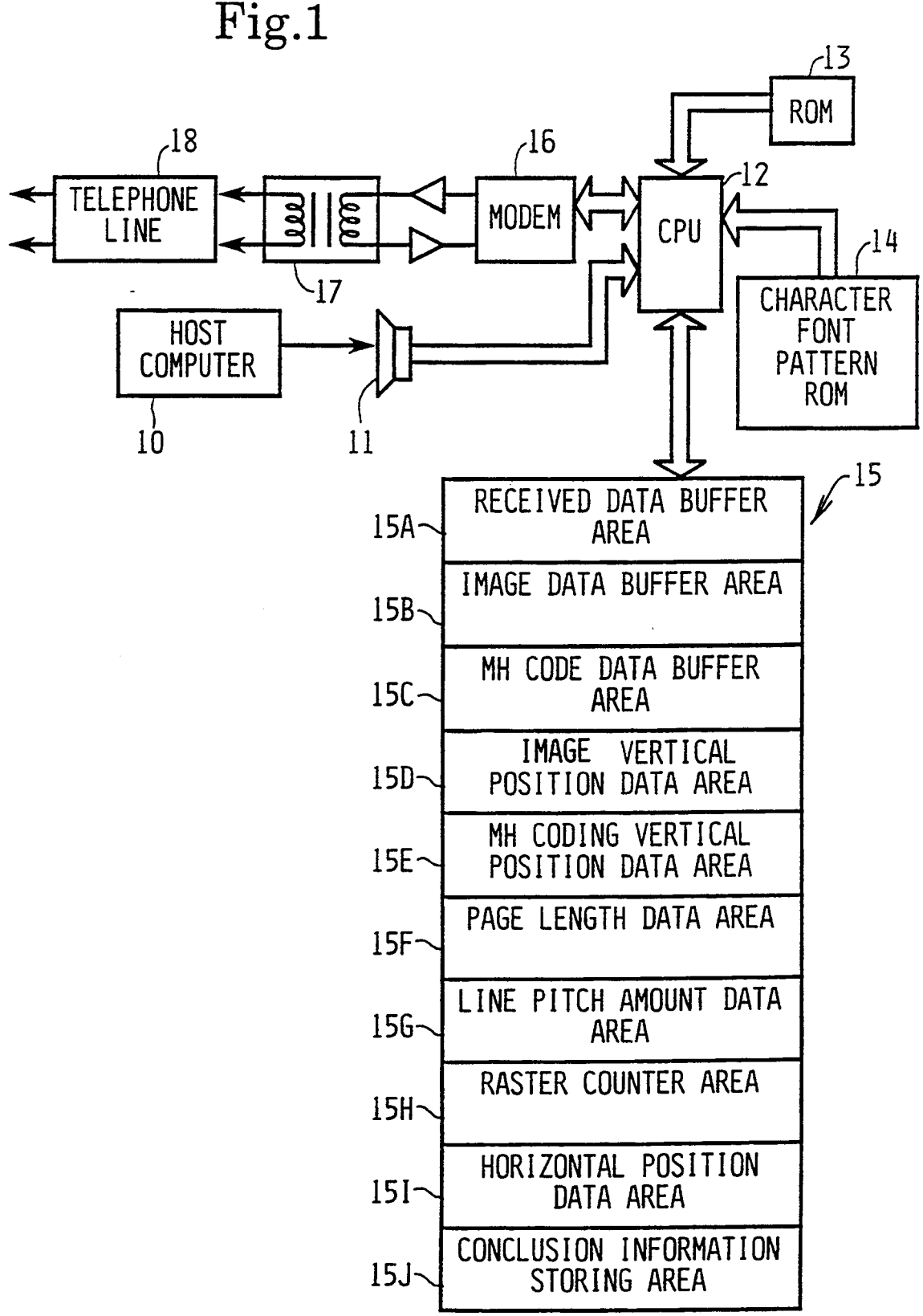
FIG. 1 is a block diagram showing a facsimile data processing apparatus according to the present invention and some peripheral devices.
Figure 2A:
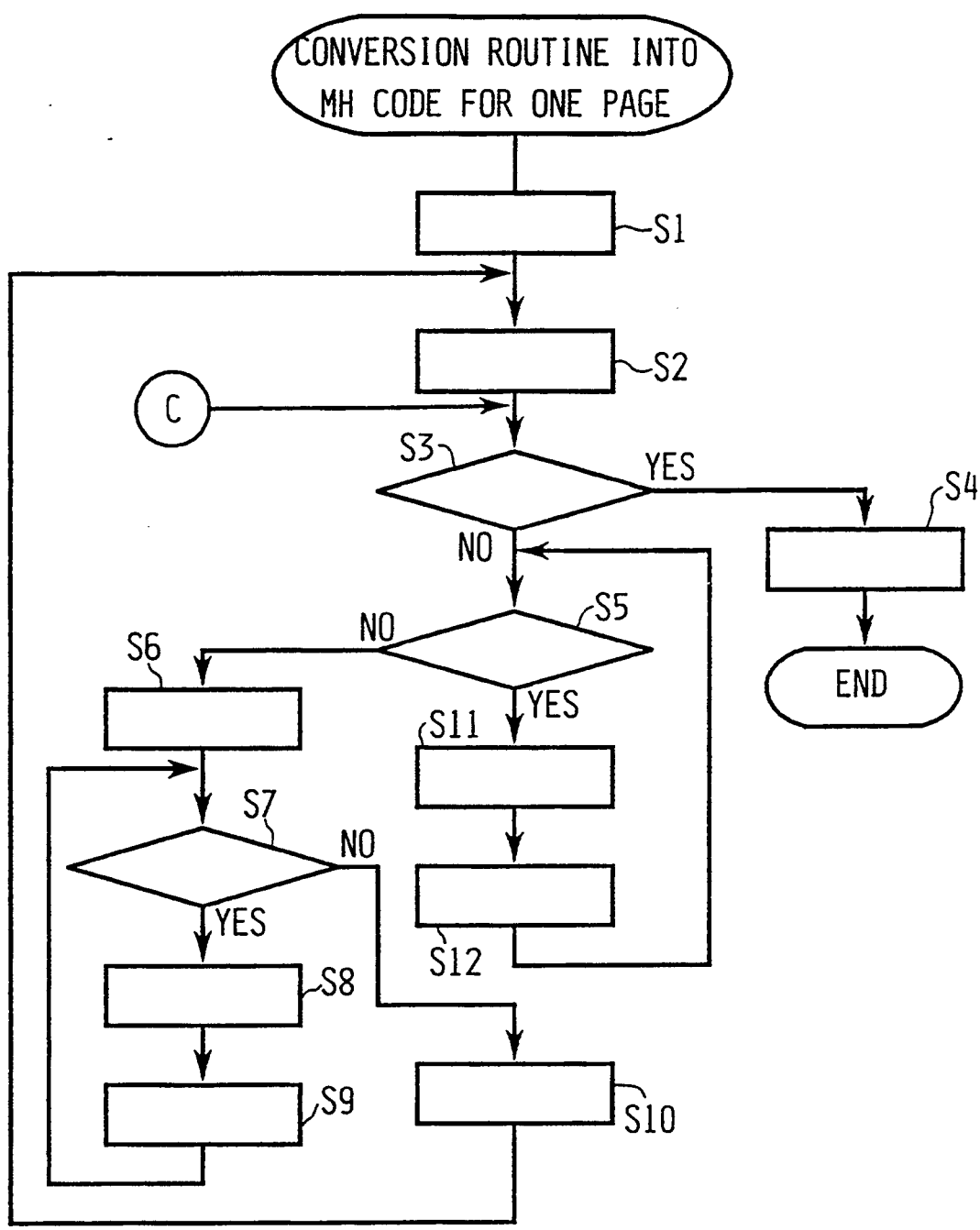
Figure 3A:
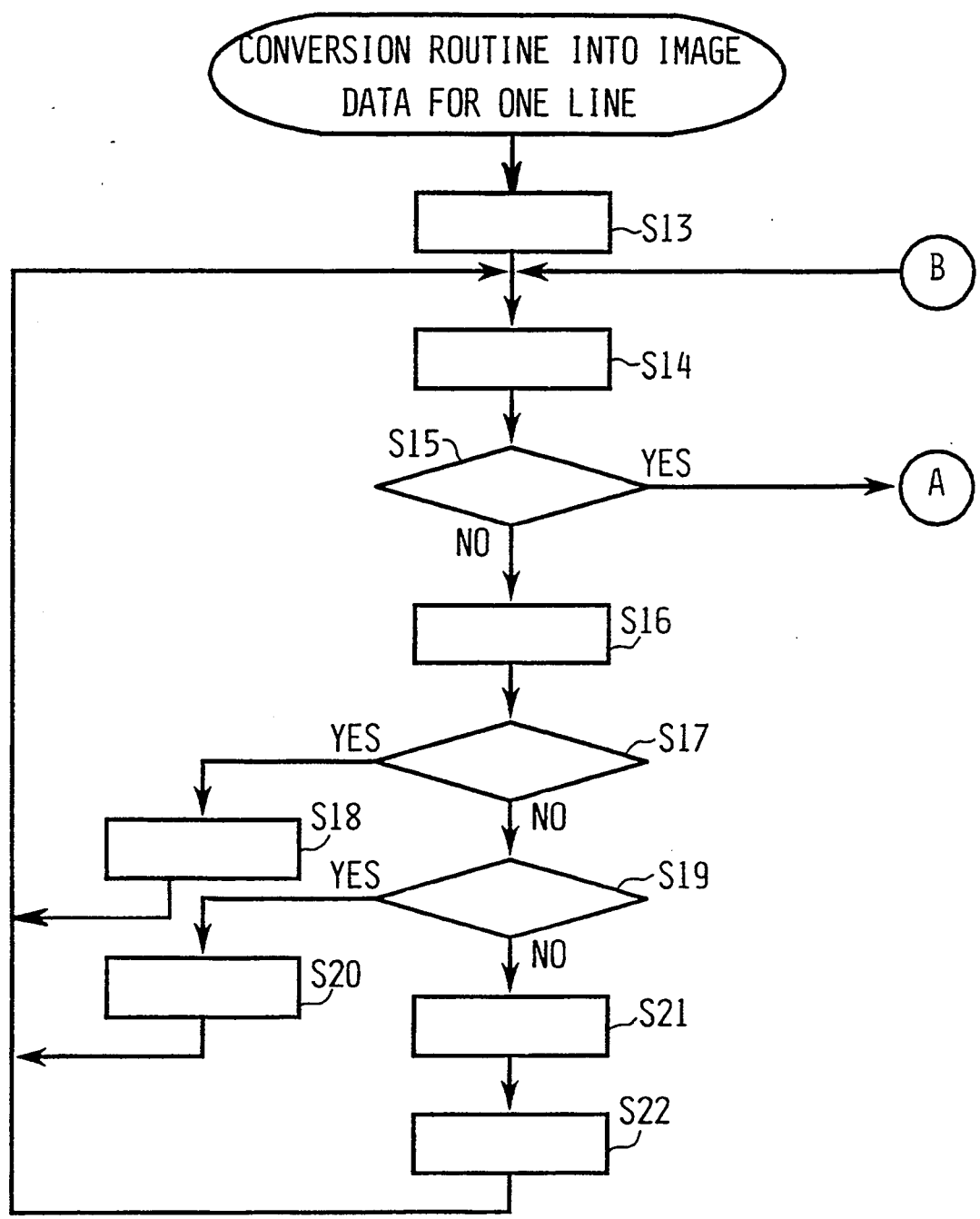
FIGS. 3A and 4A are flow charts showing a conversion routine into image data for one line.
Figure 4A:
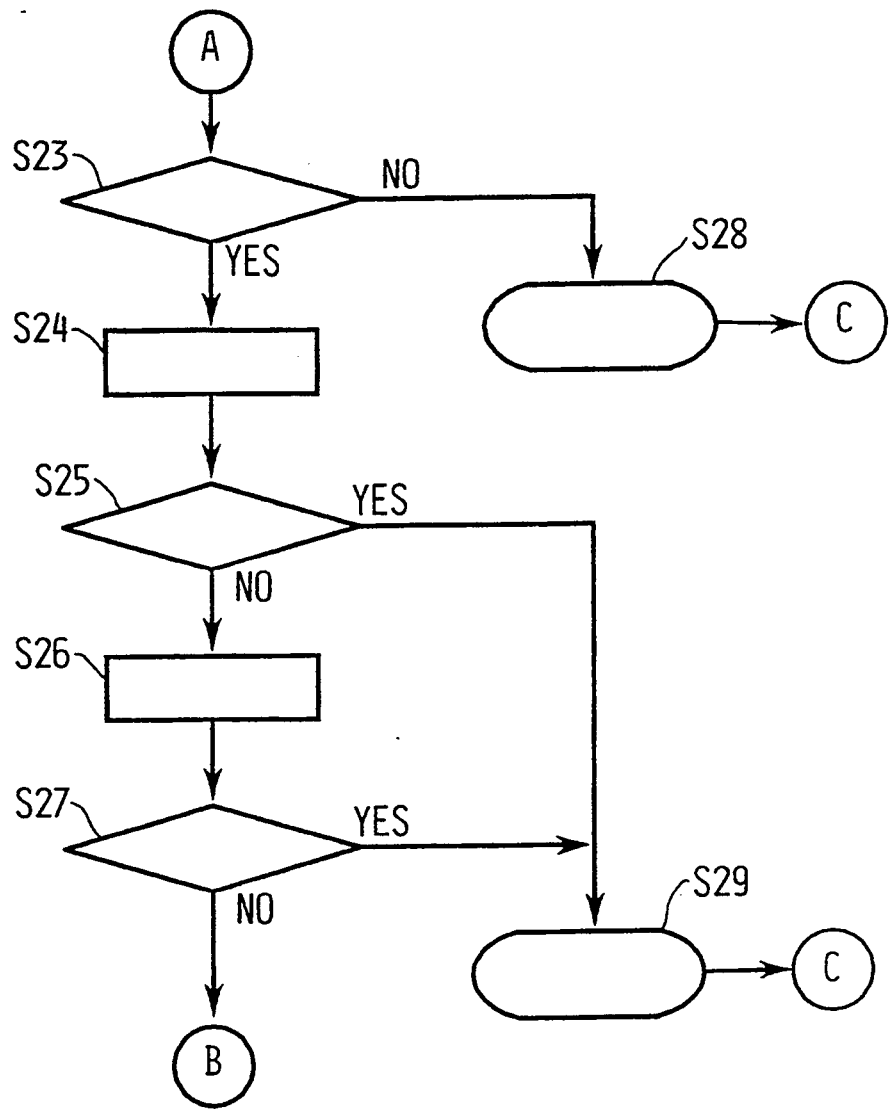

FIG. 1 is a block diagram which shows the configuration of this embodiment. Character codes and control codes, including printer control codes, from a host computer 10 are input into a central processing unit (CPU) 12 through a serial interface connecter 11. The facsimile data processing apparatus of this embodiment includes the CPU 12, a ROM 13 in which programs are stored, a character font pattern ROM 14, and a RAM 15. The CPU 12, ROM 13, character font pattern ROM 14, and RAM 15 operate together according to the program stored in the ROM 13 and constitute a microcomputer to control the facsimile data processing apparatus.

The RAM 15 includes a received data buffer area 15A for storing character codes and control codes, including printer control codes, received through the serial interface connecter 11; an image data buffer area 15B in which image data, converted from character codes by using the character font pattern ROM 14, is stored; an MH code data buffer area 15C in which transmission code data, which in this embodiment is MH code data, converted from image data being stored in the image data buffer area 15B, is stored; an image vertical position data area 15D in which a vertical uppermost raster position of the one line of image data, which should be subjected to a conversion into MH code, is stored; an MH coding vertical position data area 15E in which a vertical raster position of image data, which should be subjected to the conversion into MH code at the next time, is stored; a page length data area 15F in which a page length, representing a vertical size of one page represented by the number of rasters is stored; a line pitch amount data area 15G in which a line pitch represented by the number of rasters is stored; a raster counter area 15H to count the number of rasters; a horizontal position data area 15I in which an emulated horizontal position of an impact printer head is stored as a variable; and a conclusion information storing area 15J in which a conclusion information, which shows the conclusion status of the conversion into image data of one line or the one page, is stored.

The variable, designated CPX, stored in the horizontal position data area 15I varies by receiving emulated printer control codes accompanying a horizontal movement of the impact printer head, such as a space code and character codes.

The MH code data stored in the MH code data buffer area 15C is supplied to a modem 16 and is modulated thereby. The modulated output is supplied to a telephone line 18 through a mesh control unit 17 and then is supplied to a receiving facsimile apparatus (not shown).

The operation of the embodiment as described above will now be explained with reference to the flow charts of FIGS. 2A, 2B, 3A, 3B, 4A and 4B.

Character codes and control codes supplied from the host computer 10 are received by the CPU 12, through the serial interface connecter 11, and are stored one after another in the address of the received data buffer area 15A pointed to by a writing pointer of the received data buffer 15A.

When the character codes and control codes are stored in the received data buffer area 15A, the process enters a routine of conversion from image data into MH code for one page, as shown in FIG. 2. At step S1, the image vertical position data area 15D, whose content is represented by IMGY, is initialized, i.e. IMGY=0; the MH coding vertical position data area 15E, whose content is represented by MHY, is initialized, i.e. MHY=0; the page length data area 15F, whose content is represented by PAGE, is initialized, i.e. PAGE=2240; and the line pitch amount data area 15G, whose content is represented by LINE, is initialized, i.e. LINE=32. In this embodiment, the number of rasters for one character are predetermined to be 28, the number of rasters of basic line pitch are predetermined to be 32, and line numbers of one page are predetermined to be 70. Thus, the number of rasters for one page are 32×70=2240.

Following step S1, the conversion process into image data for one line is carried out (step S2). The conversion routine into image data for one line will be described with reference to FIGS. 3 and 4.

When the process starts the conversion routine from character and control codes into image data for one line, the image data buffer area 15B is initialized and the horizontal position data area 15I, whose content is represented by CPX, is initialized, i.e. CPX=0 (step S13).

Following step S13, the code stored in the received data buffer area 15A is read from the address pointed by the read pointer (step S14). Then it is checked whether the read code is a page feed code or a line feed code (step S15). When it is judged that the read code is neither a page feed code nor a line feed code, the read pointer of the received data buffer area 15A is advanced (step S16). It is then checked whether the code read at step S14 is a line pitch control command "1" or not (step S17). If it is judged that the code is the line pitch control command "1" a value "32" is stored in the line pitch amount data area 15G, i.e. LINE=32 (step S18).

If the judgement in step S17 is NO, then it is checked whether the code read at step S14 is a line pitch control command "2" or not (step S19). If it is judged that the code is the line pitch control command "2", then a value "48" is stored in the line pitch amount data area 15G, i.e. LINE=48 (step S20). This means that the line pitch amount is renewed by the line pitch control command "1" or the line pitch control command "2" at steps S18 or S20, respectively.

If the judgement in step S19 is NO, then the code read at step S14 is a character code, and, therefore, the character code is converted into image data by referring to the character font pattern ROM 14 and the converted image data is stored in the image data buffer area 15B (step S21). Then CPX is renewed by having "1" added thereto (step S22). After the step S22, the process beginning at step S14 is again carried out.

If the code read at step S14 is a page feed code or a line feed code, the result in step S15 is YES, and then it is checked whether CPX is "0" or not (step S23). As CPX is initialized at step S13 (CPX=0), and is renewed only by having "1" added thereto after the step S21, in which a character code is converted into image code, the fact that CPX is not "0" means that the conversion into image data has been carried out. Therefore, it may be concluded that conclusion information "0" is stored in the conclusion information storing area 15J and the conversion routine into image data for one line of character and control code is finished (step S28). In this case, the conversion routine into image data for one line is finished without executing the processes of steps S25, S26, S27 and S29, which correspond to the processes for the page feed code or the line feed code to be described later. However, as the read pointer of the received data buffer area 15A is not advanced, the same page feed code or the same line feed code previously read from data buffer area 15A is again used when the conversion routine into image data is carried out the next time.

If it is judged that CPX is "0" at step S23, the read pointer of the received data buffer area 15A is advanced (step S24). Then it is checked whether the code read at step S14 is a page feed code or not (step S25). If it is judged, at step S25, that the code is a page feed code, then conclusion information "1" is stored in the conclusion information storing area 15J and the conversion routine into image data for one line is finished. On the other hand, if it is judged, at step S25, that the code is not a page feed code, i.e. the code is a line feed code, IMGY is renewed, at step S26, by having added thereto the value of LINE, which was initialized at step S1 or previously renewed at steps S18 or S20.

Following step S26, it is checked whether or not IMGY+32>PAGE at step S27. The addition "IMGY+32" represents the lower end raster position of the image data converted from character code which would be converted for the next line. Therefore, checking whether or not IMGY+32>PAGE means checking whether there is enough line space for printing another line on the page. If it is judged that IMGY+32 is greater than PAGE, i.e. if the result of step S27 is YES, that means the image conversion process for one page is concluded, and, therefore, the conclusion information "1" is stored in the conclusion information storing area 15J, and the image conversion routine for one page is concluded (step S29).

If it is judged, in step S27, that IMGY is not greater than PAGE, i.e. if the result of step S27 is NO, then the process is repeated commencing with step S14 for the next input character or control code. Namely, if the next code is a code other than the page feed code or the line feed code, the read pointer of the received data buffer area 15A is renewed, if the next code is the line pitch amount control code, LINE is changed, and if the next code is the character code, it is converted into image data and CPX is renewed.

Referring back to FIGS. 2A, 2B the conversion routine into MH code for one page will be explained.

Following step S2, it is checked whether the conclusion information of the image conversion process for one line is "1" or not (step S3). If the conclusion information of the image conversion process, stored in the conclusion information storing area 15J, is "1" that means a page feed is required. Therefore, if the result of step S3 is YES, a control return code RTC is stored in the MH code data buffer area 15C (step S4), and the conversion routine into MH code for one page is finished.

If it is judged, at step S3, that the conclusion information is "0" then it is checked, at step S5, whether or not MHY<IMGY. If the result of step S5 is NO, the raster counter area 15H, whose content is represented by C, is initialized at step S6, i.e. C=0, then it is checked whether or not C<28 (step S7).

If the result of step S7 is YES, Cth raster of image data stored in the image data buffer area 15B is converted into MH code, and the converted MH code is stored in the MH code data buffer area 15C (step S8). Following step S8, C is renewed by having "1" added thereto (step S9), then the process returns to step S7 again. In this manner, all rasters for one line, i.e. 28 rasters in this embodiment, are converted into MH codes by the repetition of the steps S7, S8 and S9. When the conversion into MH codes concerning all rasters for one line is completed, the result of step S7 becomes NO, and the vertical raster position, which should be subjected to the conversion into MH code the next iteration, is renewed by having the value "28" added to the content, MHY, of the MH coding vertical position data area 15E (step S10). After step S10, the process returns to step S2.

If it is judged that MHY<IMGY at step S5, then MH code data corresponding to one raster WHITE code, whose run-length is 1728 (A4 size), is stored in the MH code data buffer area 15C (step S11), then MHY is renewed by having "1" added thereto (step S12). Steps S5, S11 and S12 are then repeated until MHY=IMGY.

Figure 5A:
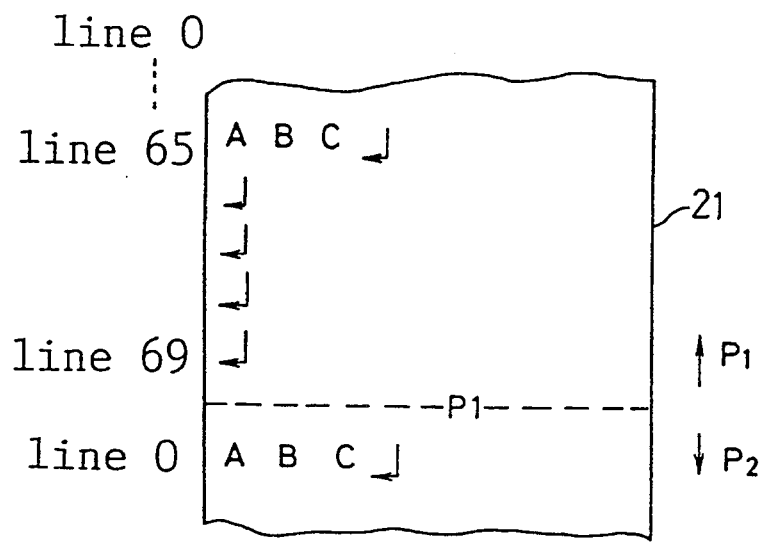
FIG. 5A shows the contents of a text file conceptionally.
Figure 5B:
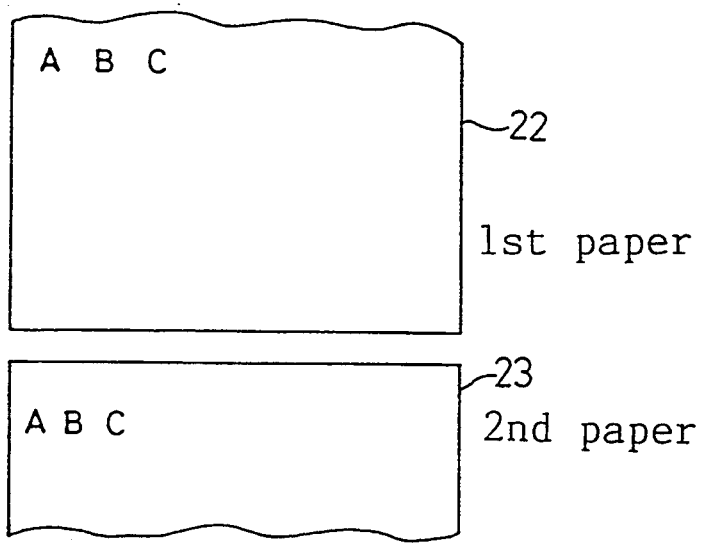
FIG. 5B shows an output result.
Figure 5C:
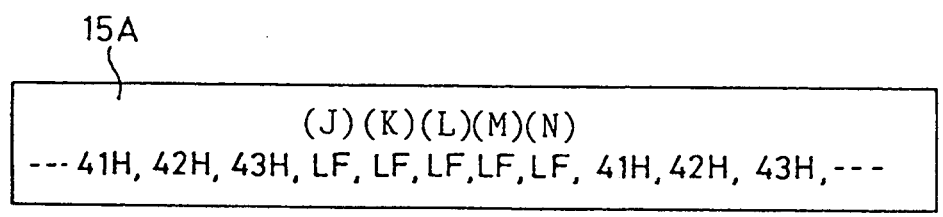
FIG. 5C shows one example of the series of codes stored in a received data buffer area.

Hereinafter, the process of the flow charts of this embodiment will be explained using an example. For this example, as shown in FIG. 5A, a text file 21 created by the host computer 10 includes characters "A", "B" and "C" in the 65th line counting from the 0th line (first line) on a first page P1. Following the characters are five line feed codes and, again, characters "A", "B" and "C" in the 0th line (first line) on a second page P2. In this example, the codes, which are stored in the received data buffer area 15A, become as shown in FIG. 5C, where "41H" "42H" and "43H" represent the hexadecimal codes for the characters "A", "B" and "C", respectively, and "LF" represents a line feed code.

First, as a result of the initializing at step S1, the content of each area in the RAM 15 is as follows; IMGY=0, MHY=0, PAGE=2240, and LINE=32. Then, the process proceeds to the image conversion routine for one line at step S2, the image data buffer area 15B is initialized and CPX=0 is set at step S13.

At step S14, a code is read from the received data buffer area 15A. Although it is not shown in FIG. 5C, assume that a "line pitch amount control command 1" is in the file and the command "1" is read. The process then proceeds to step S18 through steps S15, S16 and S17, sets LINE=32 at step S18, and returns to step S14. As the read pointer of the received data buffer area 15A is advanced each time the process goes through the step S16, the code read at step S14 is the next code to the one just processed.

Next, if a character code (not shown), included in the 0th line (first line) of the text file 21, is read from the received data buffer area 15A at step S14, then, the process proceeds to step S21 through steps S15, S16, S17 and S19. In step S21, image data corresponding to the read code is read from the character font pattern ROM 14 and is stored in the image data buffer area 15B. Then CPX is set to CPX=1 at step S22. Every time a character code is read, corresponding image data is stored in the image data buffer area 15B.

When the "line feed code" marking the end of the 0th line of the text file 21 is read at step S14, the result of step S15 is YES, and the process proceeds to step S23. As CPX is not "0" at this stage, the result of step S23 is NO, and the process proceeds to step S3 after the conclusion information "0" is stored in the conclusion information storing area 15J. In this case, the read pointer of the received data buffer area 15A is not advanced after the "line feed code" is read from the received data buffer area 15A, so the read pointer remains pointing to the address where the "line feed code" is stored.

Next, as the conclusion information is "0", the result in step S3 is NO, and it is judged whether MHY<IMGY. At this time, MHY=0 and IMGY=0, set at step S1, the values not having been renewed or reset, so the result of step S5 is NO and the processes of steps S7, S8 and S9 are repeated 28 times, i.e. the processes are repeated until all image data for the characters included in the 0th line is converted into MH code. After that is completed, at step S28, MHY is set to MHY=28 by adding "28" to MHY (=0).

The process then returns to step S2, the image data buffer area 15B is again initialized and CPX is set to CPX=0 at step S13. As the read pointer has remained pointing at the address of the "line feed code", the "line feed code" is again read from the received data buffer area 15A at step S14. As a result, step S15 is YES and the process proceeds to step S23. As CPX was not renewed after it was set to CPX=0 at step S13, the result of step S23 is YES and the read pointer is advanced at step S24. At this time, the read pointer points to the address of the first code included in the 1st line (physically the 2nd line) of the text file 21. However, the code being currently operated on is the "line feed code" of the 0th line and the result of step S25 is NO. The value of LINE IT (=32) is added to IMGY (=0) at step S26 setting IGMY to IMGY=32. At this point, since IMGY=32 and PAGE=2240, the result of step S27 is NO and the process again returns to step S14.

At step S14, the first code of the 1st line is read. If the read code is a character code, image data corresponding to the read code is stored in the image data buffer area 15B. Then, CPX is set to CPX=1 at step S22 and processing returns to step S14.

Next, if the "line feed code" included in the 1st line is read at step S14, the result of step S15 is YES and process proceeds to step S23. At this stage, because CPX is not "0", the result of step S23 is NO and the conclusion information "0" is stored in the conclusion information storing area 15J at step S28 and the process proceeds to step S3. Because the read pointer of the received data buffer area 15A is not renewed after the "line feed code" is read out, the read pointer continues to point at the same address where the "line feed code" is stored. Processing proceeds to step S3.

The conclusion information is "0" at this stage, the result of step S3 is NO, and it is judged that whether or not MHY<IMGY at step S5. According to the process so far, MHY=28 and IMGY=32, with the result that step S5 is YES. Therefore, at step S11, MH code data corresponding to one raster of WHITE code whose run-length is "1728" is stored in the MH code data buffer area 15C. At the following step S12, "1" is added to MHY and the process returns to step S5. The series of steps S5, S11 and S12 is repeated four times until MHY is set to MHY=32. Accordingly, the MH code corresponding to four rasters of WHITE code are added following the MH code data corresponding to the image data of the characters included in the 0th line, which were previously stored, to the MH code data buffer area 15C.

When the value of MHY becomes "32", the result of step S5 is NO, and the processes of steps S7, S8 and S9 are repeated until all of the image data for the characters included in the 1st line is converted into MH code, i.e. the processes are repeated 28 times. After that, at step S10, "28" is added to MHY to become MHY=60.

As described above, IMGY is renewed by having added thereto the value of LINE (=32 in the above example), at step S26, each time the conversion into image data for one line is completed. Therefore, at the time when the character codes in the 64th line of the text file 21 are concluded, the value of IMGY has become "2080" (=65×32).

If the character codes "41H", "42H" and "43H" in the 65th line are read from the received data buffer area 15A, characters "A", "B" and "C" are converted into image data, respectively, at step S21. After that, if the line feed code J is read, because CPX is not "0", the conclusion information is set to "0" in step 28, without advancing the read pointer of the received data buffer area 15A, and the process proceeds to step S3. Then, after executing steps S3, S5 and S6, steps S7–S9 are repeated and the characters "A", "B" and "C" are converted into MH code and the process returns to step S2 followed by step S13.

After initializing at step S13, the line feed code J is again read at step S14 and processing executes steps S15, S23, S24 and S25. IMGY is set to IMGY=2112 by the value of LINE(=32) being added to IMGY(=2080) at step S26. Since IMGY is less than PAGE, processing returns to step S14 where the line feed code K is read.

When the line feed code K is read, processing proceeds through steps S15, S23, S24 and S25 and IMGY is set to IMGY=2144 by the value of LINE (=32) being added to IMGY(=2112) at step S26.

In the same manner, each time the line feed codes L, M and N are read out, the value of LINE is added to IMGY, and when the line feed code N, i.e. the line feed code of the very last line, the 69th line of the first page, is read, IMGY is set to IMGY=2240 by the process of step S26. Therefore, the result of step S27 is YES, since IMGY=2272 which is greater than PAGE=2240, and the process is concluded by making the conclusion information "1". As a result, step S3 becomes YES and the conversion into MH code for the first page P1 is finished with the control return code RTC being stored in the MH code data buffer area 15C.

As is obvious from the above explanation, the space portion from the line feed code of the 65th line, and subsequent lines, on the first page P1 of the text file 21 is not converted into image data nor is it converted into MH code.

Following the above process, the characters "A", "B" and "C" on the second page P2 are converted into image data, and the image data is converted into MH code.

The data converted into MH code, as described above, is modulated by the modem 16. The modulated output is supplied to the telephone line through the net control unit 17 and is received by a receiving facsimile machine (not shown). As the control return code RTC is added after the MH code of the 65th line, in which the last character "C" of the first page P1 is included, the receiving facsimile machine, which receives the control return code RTC, executes a page feed process and then outputs the characters "A", "B" and "C" included in the second page of the text file 21, on the next page. Therefore, as shown in FIG. 5B, in the output result by the receiving facsimile machine, the characters "ABC" are printed on the 65th line of the first paper 22 and the characters "ABC" are printed on the 0th line of the second paper 23.

As described above, according to the invention, the conversion into image data and into MH code of the space following to the last character line on a page is eliminated. Therefore, transmission time is shortened, the capacity of image data memory area is saved, and the conversion from character code into image data and the conversion from image data into transmission code becomes faster.

We claim:

1. A facsimile data processing apparatus connectable to a hot computer, comprising:
    received code memory means for receiving and storing printer control code and character code output from the host computer;
    first conversion means for converting the character code, stored in said received code memory means, into image data;
    second conversion means for converting the converted image data into transmission code;
    detecting means for detecting the last character code of a page stored in said received code memory means; and
    return code adding means for adding a return code indicating end of page following the transmission code for the last character code detected by said detecting means, wherein any space at an end of the page following a last character line is neither converted into image data nor converted into transmission code thereby reducing both conversion and transmission time.

2. A facsimile data processing apparatus connectable to a host computer comprising:
    received code storing means for receiving and storing printer control code and character code output from the host computer;
    first conversion means for converting the character code into image data;
    second conversion means for converting the converted image data into transmission code;
    page length storing means for memorizing a page length that constitutes a first variable;
    line pitch amount memory means for memorizing a line pitch amount that constitutes a second variable;

image vertical position storing means for storing a vertical position of image data which should be subjected to the conversion into transmission code during a next conversion operation into transmission code, said vertical position constituting a third variable;

calculation means for calculating the sum of said third and second variables stored in said image vertical position storing means and said line pitch amount memory means respectively after each conversion operation into transmission code;

judging means for judging whether said sum is bigger than the first variable stored in said page length storing means; and return code adding means for adding a return code following the transmission code of the last character code when the result of the judgement by said judging mean is yes.

3. A facsimile data processing apparatus connectable to a host computer, comprising:

a received code memory means for receiving and storing character code and printer control code from the host computer;

first conversion means for converting the character code, into image data;

second conversion means for converting image data into transmission code;

detecting means for determining the end of a page of material for transmission; and end means for adding a return code immediately after the transmission code for a last character on the page of material indicating end of page, wherein any space at an end of the page following a last character line is neither converted into image data nor converted into transmission code thereby reducing both conversion and transmission time.

4. The facsimile data processing apparatus as claimed in claim 3, further comprising line count means, wherein said end means adds the return code based on a line count greater than a predetermined value.

5. The facsimile data processing apparatus of claim 4, wherein determination of the line count by the line count means is accomplished following the conversion of a line of image code into transmission code, adding an additional line and determining whether the additional line added to the line just converted exceeds the predetermined value.

6. The facsimile data processing apparatus of claim 5, wherein a page length and a line pitch are measured by the number of rasters therein, the page length equal to the number of lines times the line pitch.

* * * * *